April 1, 1924.
C. D. BURCHENAL
APPARATUS FOR OPERATING ON FILTRABLE MATERIALS
Filed Oct. 9, 1920 2 Sheets-Sheet 1
1,488,862
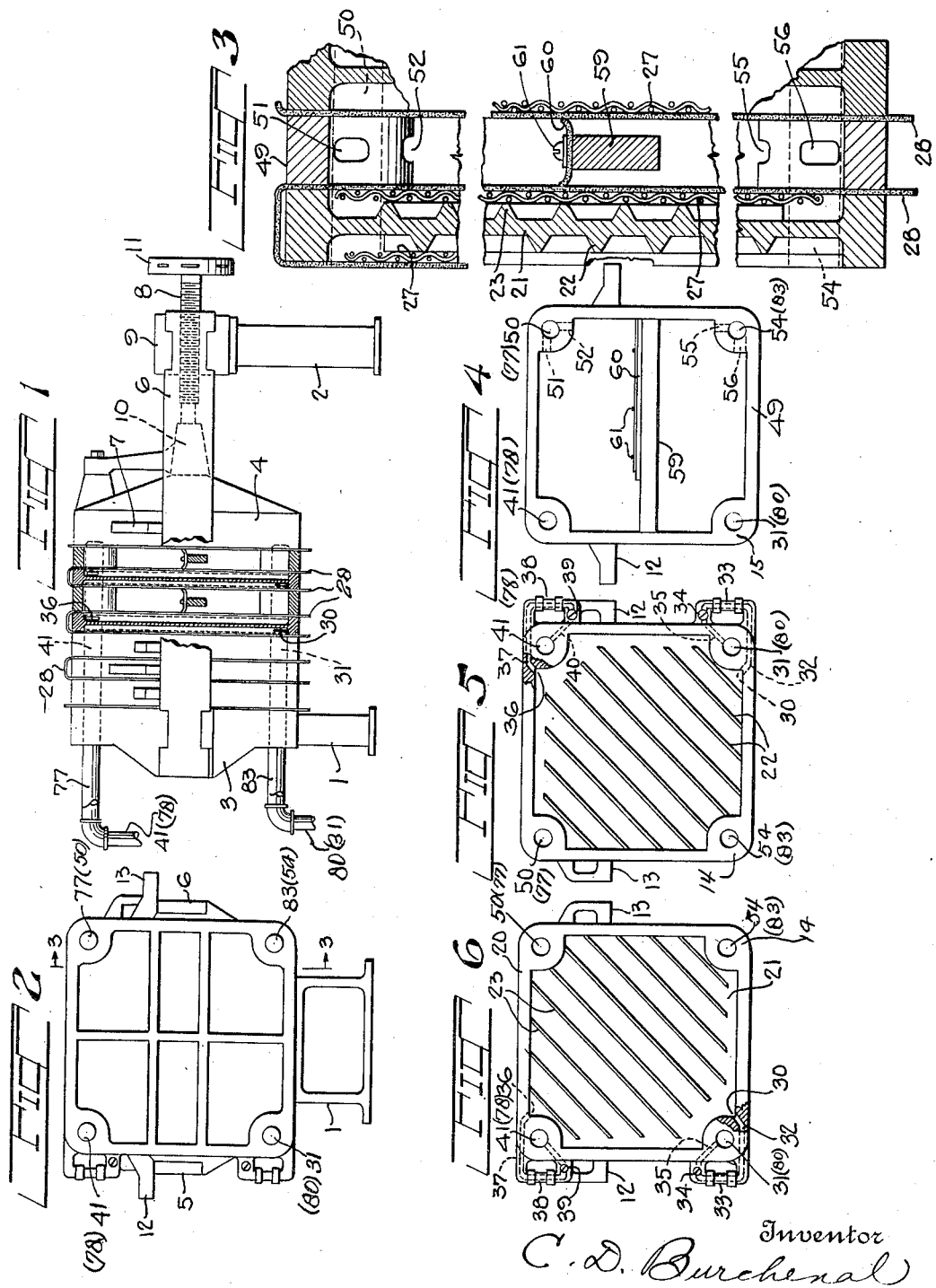
Inventor
C. D. Burchenal
By John D. Morgan
Attorney

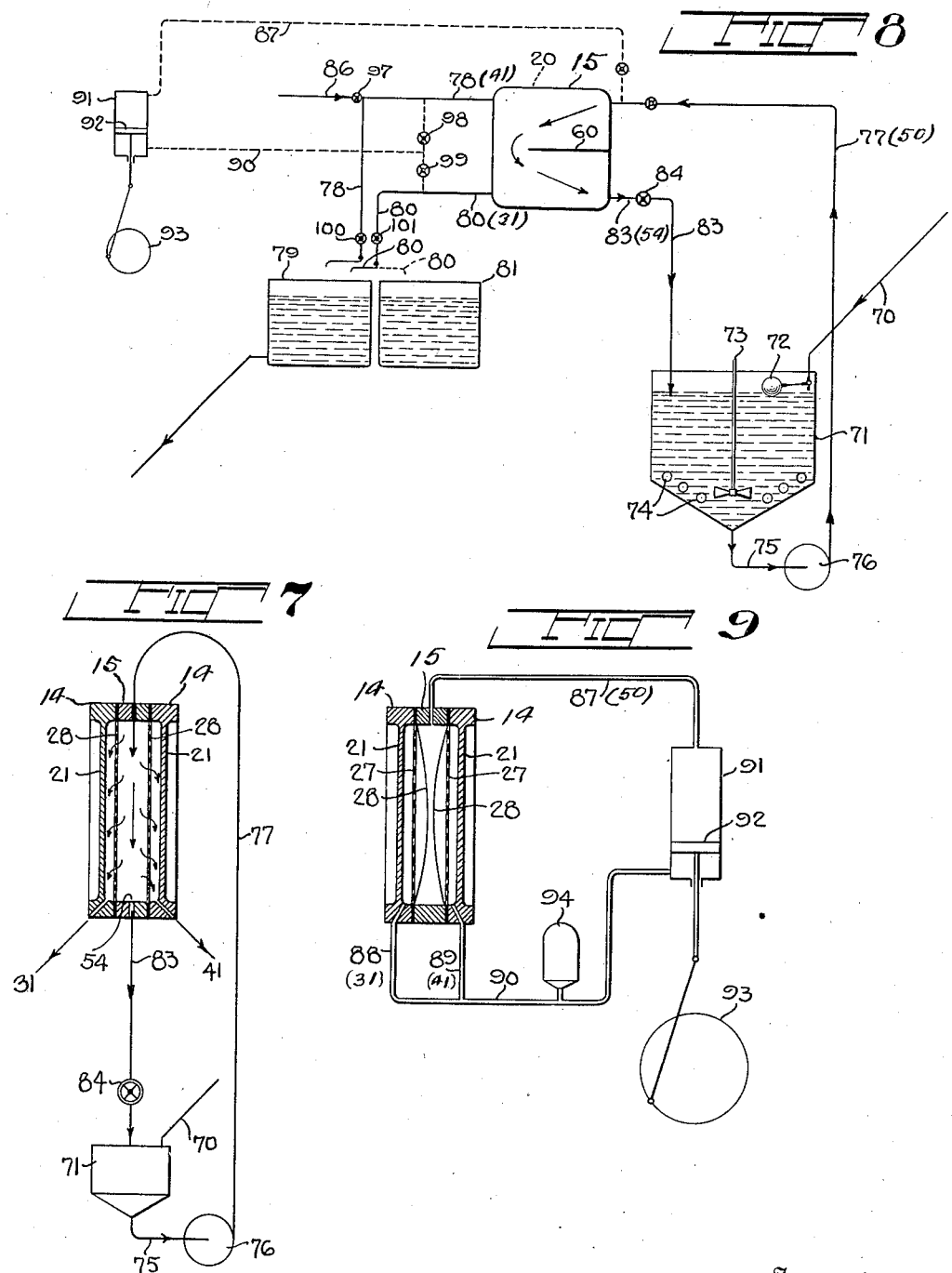

Patented Apr. 1, 1924.

1,488,862

UNITED STATES PATENT OFFICE.

CHARLES D. BURCHENAL, OF NEW YORK, N. Y.

APPARATUS FOR OPERATING ON FILTRABLE MATERIALS.

Application filed October 9, 1920. Serial No. 415,892.

*To all whom it may concern:*

Be it known that I, CHARLES D. BURCHENAL, a citizen of the United States, residing in the city, county, and State of New York, have made certain new and useful Improvements in Apparatus for Operating on Filtrable Materials, of which the following is a specification.

The invention relates to an improved form of plate and frame filter press, and to a process of filtration or of infusion, decolorizing, or extracting in the practice of which process the filter is useful.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations, steps, processes and improvements herein shown and described.

The accompanying drawings, herein referred to and constituting a part hereof, illustrate one embodiment of the filter press, and illustrate also, more or less diagrammatically, certain steps in practicing the process, said drawings in connection with the description serving to explain the principles of the invention.

Of the drawings:—

Fig. 1 is a side elevation of a filter press, with certain of its plates and frames in vertical section;

Fig. 2 is an end elevation, looking at Fig. 1 from the left;

Fig. 3 is a vertical section, on an enlarged scale, taken through a filter plate and frame, and may be regarded as taken substantially on the line 3—3 of Fig. 2;

Fig. 4 is a detached elevation of a filter frame showing in elevation the baffle which is shown in Fig. 3 in section;

Fig. 5 is a detached elevation showing one side of a filter plate;

Fig. 6 is a detached elevation showing the opposite side of the same filter plate;

Fig. 7 is a diagrammatic view showing the manner of operation of the filter;

Fig. 8 is a diagrammatic view illustrating certain steps in the process; and

Fig. 9 is a diagrammatic view of the filter cleaning operation.

The invention comprises a novel filter press of the plate and frame type capacitated to permit the material or fluid which is being filtered to be circulated continuously through the filter. The filtered liquid and the concentrated fluid or semi-fluid may be discharged separately from each other, or the solid matter after separation may be retained and formed into a dry cake within the frames, as desired, or concentrated, previously-filtered fluid may be returned to the cells to be formed into a dry cake.

The invention further comprises a process in which a filter of the kind described may be utilized, for the treatment of liquids by solid materials in powdered or other finely divided form, such as in making extracts or infusions, or in decolorizing and continuously delivering the liquid free from solid particles, and later discharging the solid powdered material, when spent or exhausted, in the form of a dry cake.

The process comprises also means for keeping the filter cloths or other filtering media free from clogging and resultant inefficiency due to adherence thereto of the solid particles, this cleaning process being carried on concurrently or alternately with the filtering process.

Other features of the invention, together with certain advantages thereof, will be set forth hereinafter in connection with the detailed description, and it will be understood that the preceding general description and the following detailed description are explanatory and exemplary of the invention and not restrictive thereof.

Referring now in detail to the embodied form of apparatus illustrated by way of example in the accompanying drawings, and referring for the present more particularly to Figs. 1 to 6. As shown in Figs. 1 and 2, the filter structure is supported on standards 1 and 2. Mounted on the standard 1 is a fixed head 3, between which and the movable head 4 are arranged the filter frames and plates. Horizontal supporting and guiding members are arranged on either side of the structure and are supported by the fixed head 3 and the upper part of the standard 2. The movable head 4 is provided with laterally projecting lugs 7 which engage the top of the supporting and guiding members 5 and 6, thereby supporting the head 4 in a way that permits it to be adjusted longitudinally of the machine. In order to provide for the longitudinal movement of the head 4, there is provided a screw threaded shaft 8, which is in threaded engagement with a crosspiece 9 mounted on the standard 2, this shaft 8 being connected at 10 to the movable head 4 and at its outer end being provided with any suitable form of turning head 11. The plates 14 and the frames 15, which are alternately arranged between the heads 3 and 4, are provided with lugs 12 and 13 by which they are supported upon the members 5 and 6; and the filtering media are arranged between these plates and frames. With this construction, the plates and frames and the interposed filtering media may be clamped between the heads 3 and 4 by manipulation of the screw 8; and may be separated at any time for the removal from the frames 15 of solid matter which may have accumulated therein or for the removal and re-insertion of filter media.

Referring now in detail to the embodied form of filter plate 14, these plates comprise an outer or peripheral rim 20, preferably of general rectangular conformation, as appears from Figs. 5 and 6. Considering the filter as being arranged horizontally, as shown in Figs. 1 and 2, the rim 20 is provided with a vertically disposed web 21, preferably integral with the rim 20, but relatively thin as compared to the rim 20, and arranged centrally thereof, so as to provide space within the rim on either side of the web.

The web 21 is preferably provided, on both sides thereof, with ribs or ridges 22 and 23, projecting outwardly therefrom, and intended to furnish supports for a wide mesh screen which supports the filtering medium, preferably cloth 28, which is interposed between the plates and the frames, and through which the fluid is forced in the filtering operation. As embodied, the ribs 22 and 23 are preferably arranged transversely with respect to each other, so that the ribs on one side of web 21 extend transversely or perpendicularly to those on the other side thereof, and both sets of ribs are arranged obliquely with respect to their rim 20.

The filtering media consist usually and preferably of sheets of filter cloth 28, as is best shown in Fig. 3, the sheets being preferably stretched over one face of a plate, about the edge thereof and back along the opposite face of the plate, as shown in said figure. Supporting the filter cloths in the present embodiment are coarse wire screens 27, filling or nearly filling the spaces within the rims 20 of the plates 14, the screens being supported by the ribs 22 and 23.

The discharge means from the filter frames, by which the filtered liquid passes out, comprise an opening from one side of each plate 14 into a discharge header 41, and an opening from the opposite side of the plate into another discharge header 31. As shown in Figure 6, an opening 30 communicates from the face of the filter plate shown in that figure into a passage 32, thence through a sight glass 33 and a cock 34, discharging by passage 35 into the header 31. The sight glass provides observation means whereby an attendant can keep watch over each individual unit of the filter, and by means of the cocks either side of any filter plate may be shut off when not performing properly. From the opposite side of each filter plate, a like opening 36 communicates with a passage 37, which leads to a sight glass 38 and through a cock 39, to a passage 40 communicating with the other discharge header 41. The headers 31 and 41 in the various plates 14 have continuations in the structure of the interposed frames 15, but have no communication therewith, as shown in Fig. 4, whereby the discharge headers are continuous throughout the entire series of filter units, irrespective of their number. These discharge headers empty, respectively, into pipes, having connections as hereinafter described.

Referring now to the embodied form of filter frame 15 (Figs. 1, 3 and 4), the frame comprises a rim 49, of rectangular conformation, of the same size and shape as the rims 20 of the filter plates 14 so as to form therewith a complete and closed filter unit. The supply line for the fluid to be filtered comprises a supply or inlet header 50 having openings 51 and 52 into each of the frames 15.

In accordance with one feature of the invention, the frames 15 are provided with a discharge line or outlet comprising a discharge header 54, having openings 55 and 56 into the body of the frame 15, thru which liquid or sludge may flow or be discharged from the frames 15.

In accordance with another feature of the invention, a horizontal baffle is provided within each frame 15, whereby the liquid to be filtered is prevented from flowing directly to the frame outlets 55 and 56, but is given a tortuous passage, thus flowing across the entire area of the filtering media. In the embodied form thereof, a support 59 extends horizontally transversely of the frame 15, and is integral with or fixed to the vertical reaches of the rim 49. Mounted on the support 59 is a baffle strip 60 of rubber or other yielding and preferably resilient material, fastened to the support 59 by suitable means, such as screws 61. The baffle strip 60 is preferably wider than the width of the frame 15, and when the filter plates 14 and the filter frame 15 are assembled, the edges of the baffle strip 60 will abut upon and press against the filtering cloths 28 at either side of the frame and will constitute a fluid tight joint therewith across the greater portion of the frame, while permitting fluid to flow past the end of the baffle strip 60, as will appear from Figs. 3 and 4. A plurality of the baffle strips may be employed in a filter frame, if desired, preferably parallel with each other, but with the flow orifices staggered, or alternating from side to side with the successive strips 60.

The baffles are preferably arranged between the supply orifices from the supply header 50 and the discharge orifices which lead into the discharge header 54. As shown the supply header 50 and the discharge header 54 are arranged at one side of the frame, preferably one above the other, and the baffle is arranged at or about the middle of, and horizontally across, the frame, and forms a closure there-across, except at the side away from the supply and discharge headers. Thus a very uniform flow is secured over the whole extent of the filtering surfaces.

Referring now to the general structure and arrangement of the apparatus, and to the process included in the invention and in the practice of which the apparatus or mechanism described may be advantageously utilized, the fluid to be filtered, or to be treated by a finely divided solid, or fluid with the powdered or other finely divided solid or solids in suspension therein, is supplied from any suitable source, which source is indicated by a pipe or conduit 70, which empties into a reservoir 71. This fluid supply may be controlled by a float valve 72 operated by the fluid in the reservoir 71. Suitable agitating devices or means 73 may be provided in the reservoir 71 to maintain a uniform mixture or density of the material or fluid therein. Also, if desired, heating means of any suitable kind or construction, such as pipes 74 may be provided. It will be obvious that the finely divided solid may be initially supplied in the reservoir if desired.

Means are provided for supplying the liquid or fluid material to be filtered to the filter frames 15, and as embodied a pipe 75 connects the reservoir 71 to a pump 76, which forces the liquid through the pipe 77 into the supply header 50 of the filter frames.

The discharge header 41 connects by pipe 78 to any suitable discharge receptacle, such as a reservoir 79. The discharge header 31 connects by a suitable pipe 80 to any convenient receptacle, such as a discharge reservoir 81, or both headers may discharge into a single receptacle or reservoir, as indicated in Fig. 8.

Means are provided by the invention for removing from the filter frames 15, the concentrated fluid containing the separated solids in the form of sludge, separated by the filtration. while it is in a fluid or semi-fluid state, and returning it to the reservoir 71, where it may be re-diluted by the supply liquid from pipe 70 and brought to the normal or desired state of the supply of the filtering material in the reservoir. The material may be reintroduced into the filter from the reservoir 71 by the means already described.

The embodied form of means for so handling the concentrated residue or sludge discharged from the filter frames 15 comprises a discharge line including a pipe 83 constituting an outlet for the discharge header 54 and preferably emptying into the reservoir 71. Means are provided for maintaining and regulating back pressure in the discharge pipe 83, so as to force a desired quantity or proportion of the supplied fluid through the filtering media, while permitting the residue in a sufficiently fluid state to be discharged through the discharge header 54 and pipe 83 and thence returned to the reservoir 71. Such means may comprise any form of valve 84, or other suitable device adapted to effect the desired balance of flow through the filtering media and through the discharge header 54 direct from the filter frame 15.

In Fig. 8 the circulation is diagrammatically shown as above described, the arrows within the filter indicating the circulation within the filter frames 15 between the supply line and the discharge line for the sludgy material which is returned to the reservoir 71 for re-mixture or redilution and re-filtration. In Fig. 7 the diagram is taken at right angles to that in Fig. 8, and shows by arrows both the flow of the filtered liquid through the filtering media and the flow of the concentrated or sludgy residue from the frames 15 back to the reservoir 71.

According to one aspect of the invention, the filtration residue is finally pumped into the frames and there reduced to dry cake form, such as is commonly produced by plate and frame filters. Thus, for example, in extracting or infusing, when the powdered solid through the action of the liquid thereon is exhausted or spent, by cutting off the return through the discharge line 83, the concentrated sludgy material may be forced into the frames and allowed to accumulate therein. If desired, the material may be washed in the frames by passing water or other liquid transversely thru the cakes and thru the header 31 and the pipe 80; and for this purpose a wash line 86, for supplying the washing water, is shown connecting to the pipe 78 leading to the header 41. After the concentrated sludgy material in the frame 49 has been washed, it may be dried by passing compressed air through the cakes in a well-known manner, and thereafter the filter may be opened by moving the head 4. and the cake removed from the frames in the usual way. From the foregoing description, it will also be clear that by cutting off the discharge line 83, which drains the discharge header 54 which in turn receives the direct flow from the frames, and by supplying the material to be filtered directly through the pipe 77, the filter may be operated in the manner common to the usual plate and frame filter.

Referring now in detail to the means and process for cleaning the filter cloths 28 while in filtering position in the filter, either concurrently with the filtration process, or alternately therewith (see Figs. 8 and 9), a closed fluid circuit is provided, shown diagrammatically as comprising pipes 87 opening into the filter frame 15, and pipes 88 and 89 opening into the abutting filter plates 14 on the two sides adjacent to the particular frame 15 being considered. Pipes 88 and 89 communicate with a pipe 90. In the mechanism the pipe 87 will preferably communicate with the supply header 50 leading to frames 15, and the pipes 88 and 89 with the discharge headers 31 and 41 from the plates 14.

In Fig. 8 a valve 97 is shown for controlling the flow of the washing liquid. Valves 98 and 99 are shown controlling the fluid flow circuit for cleaning the filter cloths 28, and valves 100 and 101 are shown in the discharge lines for the filtered liquid, these various valves cooperating together in the system of piping shown in Fig. 8 to effect either the filtering or the cloth cleaning action.

Means are provided for effecting fluid, and preferably liquid, pressure or flow through the closed system just described, such pressure or flow changing or reversing direction in rapid alternations. As embodied, a cylinder 91 is in communication with the pipes 87 and 90. The cylinder 91 is provided with a piston 92 driven from any suitable device 93. The closed fluid circuit or system just described may be provided if desired with an air cushion chamber 94. By reason of the reciprocation of the piston 92, rapidly alternating and reversing fluid pressure and fluid flow, preferably liquid, is effected in the filter. This reciprocating pressure may be applied to one side of the filter cloths, or to both sides as desired. By this action, especially when it is very rapidly alternated, not only is the cloth freed from adherent and clogging solid material by forcing the fluid through the cloth, but the rapid change of direction of motion of the fluid, causes the solid particles to separate from the cloths by reason of their own inertia.

The mode of operation of the apparatus above described is as follows: The solution to be filtered is drawn from the tank 71 through the pipe 75 by the pump 76 which forces it thru the pipe 77 and the header 50 into the frames 15. The filtrate passes thru the filter media on each side of each frame and is drawn off thru the headers 41 and 31 to which respectively are connected pipes 78 and 80 leading to the reservoirs 79 and 81. If it is desired to retain within the frames 15 all of the sludge that is separated from the filtrate, the valve 84 is closed; but if it is desired to allow the sludge to pass back to the tank 71, the valve 84 is opened to some extent, thereby permitting the sludge to pass out of the frames 15 thru the header 54 and pipe 83 back to the reservoir 71. By proper adjustment of the valve 84, the pressure within the frames 15 may be controlled to a certain extent, and the speed of filtration may thus be regulated. If desired, after the filter has been operating for some time with the valve 84 open and the sludge passing back to the tank 71, the valve 84 may be closed and cake may be built up within the frames 15 on the filter media; and this cake may be removed in the usual manner by disassembling the plates and frames.

In its broader aspects, the invention is not limited to the particulars and details of structure and procedure herein exemplarily set forth, but departures may be made therefrom, within the scope of the accompanying claims without departing from the principles of the invention and without sacrificing its chief advantages.

What I claim is:—

1. A filtering apparatus including in combination alternate plates and frames, filtering media between them, a fluid supply line opening into the frames, a filtrate discharge line from the plates, a direct discharge line from the frames, and means for creating back pressure in the discharge line from the frames.

2. A filtering apparatus including in combination alternate plates and frames, filtering media between them, a fluid supply line opening into the frames, a discharge line from the plates, a direct discharge line from the frames, and means for creating regulatable back pressure in the discharge line from the frames.

3. A filtering apparatus including in combination alternate plates and frames, filtering media between them, a fluid supply line opening into the frames, a discharge line from the plates, a direct discharge line from the frames, means for creating back pressure in the discharge line from the frames, and means for returning the outflow from the direct discharge line from the frames into said supply line.

4. A filtering apparatus including in combination alternate plates and frames, filtering media between them, a fluid supply line opening into the frames, a discharge line from the plates, a direct discharge line from the frames, means for creating back pressure in the discharge line from the frames, and means for first diluting and then returning the outflow from the direct discharge line from the plates into said supply line.

5. A filtering apparatus including in combination alternate plates and frames, filtering media between them, a fluid supply line opening into the frames, a discharge line from the plates, a direct discharge line from the frames, means for creating back pressure in the discharge line from the frames, and means for diluting the direct outflow from the frames with the supply fluid and then returning it to said supply line.

6. A filtering apparatus including in combination a filter frame, filter plates on each side of said frame, filtering media between said frame and said plates, a supply line opening into the frame, a discharge line from each of the filter plates on the side toward said frame but behind the filtering media, a direct discharge line from the frame, and means for creating back pressure in said direct discharge line from the frame.

7. A filtering apparatus including in combination filter frames and filter plates having filtering media between them, a supply line opening into the frames, a discharge line leading from each of the filter plates on each side thereof adjacent said frames but behind the filtering medium, a direct discharge line from the frames, and means for creating regulatable back pressure in said direct discharge line from the frames.

8. A filtering apparatus including in combination a filter frame and plate, a liquid reservoir, a supply line from the reservoir into the frame, a discharge line from the plate, a direct discharge line from the frame to the reservoir, and means for creating back pressure in said direct discharge line.

9. A filtering apparatus including in combination a filter frame and plate, a liquid reservoir, a supply line from the reservoir into the frame, a discharge line from the plate, a direct discharge line from the frame to the reservoir, and means for creating regulatable back pressure in said direct discharge line.

10. A filtering apparatus including in combination a filter frame and plate, a liquid reservoir, a supply line from the reservoir into the frame, a discharge line from the plate, a direct discharge line from the frame to the reservoir, means for creating back pressure in said direct discharge line, and means for agitating the liquid in the reservoir.

11. A filtering apparatus including in combination a filter frame and plate, a liquid reservoir, a supply line from the reservoir into the frame, a discharge line from the plate, a direct discharge line from the frame to the reservoir, means for creating regulatable back pressure in said direct discharge line, and means for agitating the liquid in the reservoir.

12. A filtering apparatus including in combination filter plates and frames, and flow directing baffles within the frames.

13. A filtering apparatus including in combination filter plates and frames, and flow directing baffles arranged transversely within the frames.

14. A filtering apparatus including in combination filter plates and frames, and flow directing baffles of yielding material within the frames.

15. A filtering apparatus including in combination filter plates and frames having filtering media between them, and flow directing baffles within and extending across the frames and abutting on the filtering media.

16. A filtering apparatus including in combination filter plates and filter frames having filtering media between them, the frames having an inlet and an outlet, and a flow directing baffle extending completely across each frame but not completely along the frame and interposed between the inlet and outlet and abutting on the filtering medium of the adjacent plates.

17. A filtering apparatus including in combination a filter frame and a filter plate having a filtering medium between them, the frame having an inlet and an outlet, a flow directing baffle extending completely across the frame but not completely along the frame and interposed between the inlet and outlet and abutting on the filtering medium of the plate, and means for creating back pressure in the outlet from the frame.

18. A filtering apparatus including in combination a filter frame, a plate at each side thereof, the plates having filtering media facing the frames, and a flow directing baffle extending across the frame and abutting on the filtering media of both said plates.

19. A filtering apparatus including in combination a filter frame, a plate at each side thereof, the plates having filtering media facing the frame, and a flow directing baffle of resilient material extending across the frame and abutting on the filtering media of both said plates.

In testimony whereof, I have signed my name to this specification.

CHARLES D. BURCHENAL.